United States Patent
Li (10) Patent No.: US 12,425,874 B2
(45) Date of Patent: Sep. 23, 2025

(54) DATA TRANSMISSION METHOD AND APPARTATUS AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 656 days.

(21) Appl. No.: 17/774,112

(22) PCT Filed: Nov. 6, 2019

(86) PCT No.: PCT/CN2019/116064
§ 371 (c)(1),
(2) Date: May 3, 2022

(87) PCT Pub. No.: WO2021/087824
PCT Pub. Date: May 14, 2021

(65) Prior Publication Data
US 2022/0417767 A1    Dec. 29, 2022

(51) Int. Cl.
*H04W 16/28*    (2009.01)
*H04B 7/0404*    (2017.01)
(Continued)

(52) U.S. Cl.
CPC .......... *H04W 16/28* (2013.01); *H04B 7/0404* (2013.01); *H04B 7/0408* (2013.01);
(Continued)

(58) Field of Classification Search
None
See application file for complete search history.

(56) References Cited

U.S. PATENT DOCUMENTS 11,757,517 B2 * 9/2023 Li ............ H04L 1/0023
375/262
2020/0145062 A1 * 5/2020 Jung ............ H04W 72/23
(Continued)

FOREIGN PATENT DOCUMENTS

CN    109983797 A    7/2019
CN    109983823 A    7/2019

OTHER PUBLICATIONS

PCT/CN2019/116064 International Search Report, dated Jul. 20, 2020, 3 pages.

*Primary Examiner* — Jay L Vogel
(74) *Attorney, Agent, or Firm* — Cozen O'Connor (57) ABSTRACT

A data transmission method and apparatus, and a storage medium are provided. The method includes: receiving by a terminal a MAC signaling sent by a base station, in which the MAC signaling is configured to activate beam indication information respectively corresponding to m antenna panels; receiving by the terminal the DCI sent by the base station, in which the DCI includes a first beam indication codeword; determining by the terminal target beam indication information corresponding to a target antenna panel in the m antenna panels based on the first beam indication codeword and the mapping information; determining by the terminal a target beam used when the target antenna panel is adopted to transmit data based on the target beam indication information; and using by the terminal the target beam corresponding to the target antenna panel to transmit data with the base station.

12 Claims, 3 Drawing Sheets

(51) Int. Cl.
    *H04B 7/0408*     (2017.01)
    *H04B 7/06*     (2006.01)
    *H04L 5/00*     (2006.01)
    *H04W 72/044*     (2023.01)
    *H04W 72/1263*     (2023.01)
    *H04W 72/23*     (2023.01)
    *H04W 80/02*     (2009.01)

(52) U.S. Cl.
    CPC ....... *H04B 7/0691* (2013.01); *H04B 7/06956* (2023.05); *H04W 72/046* (2013.01); *H04W 72/1263* (2013.01); *H04W 72/23* (2023.01); *H04L 5/0048* (2013.01); *H04L 5/0094* (2013.01); *H04W 80/02* (2013.01)

(56) References Cited

U.S. PATENT DOCUMENTS

| | | | |
|---|---|---|---|
| 2021/0014931 A1* | 1/2021 | Noh | H04L 5/0035 |
| 2022/0123818 A1* | 4/2022 | Li | H04B 7/088 |
| 2022/0167322 A1* | 5/2022 | Takahashi | H04B 7/0874 |
| 2024/0314767 A1* | 9/2024 | Zhang | H04W 72/1263 |

* cited by examiner

| C7  | C6  | C5  | C4  | C3  | C2  | C1  | C0  | byte1 |
|-----|-----|-----|-----|-----|-----|-----|-----|-------|
| C15 | C14 | C13 | C12 | C11 | C10 | C9  | C8  | byte2 |
| C23 | C22 | C21 | C20 | C19 | C18 | C17 | C16 | byte3 |
| C31 | C30 | C29 | C28 | C27 | C26 | C25 | C24 | byte4 |
| C39 | C38 | C37 | C36 | C35 | C34 | C33 | C32 | byte5 |
| C47 | C46 | C45 | C44 | C43 | C42 | C41 | C40 | byte6 |
| C55 | C54 | C53 | C52 | C51 | C50 | C49 | C48 | byte7 |
| C63 | C62 | C61 | C60 | C59 | C58 | C57 | C56 | byte8 |

FIG. 3

| C7  | C6  | C5  | C4  | C3  | C2  | C1  | C0  | byte1 |
|-----|-----|-----|-----|-----|-----|-----|-----|-------|
| C15 | C14 | C13 | C12 | C11 | C10 | C9  | C8  | byte2 |
| C23 | C22 | C21 | C20 | C19 | C18 | C17 | C16 | byte3 |
| C31 | C30 | C29 | C28 | C27 | C26 | C25 | C24 | byte4 |
| C39 | C38 | C37 | C36 | C35 | C34 | C33 | C32 | byte5 |
| C47 | C46 | C45 | C44 | C43 | C42 | C41 | C40 | byte6 |

DATA TRANSMISSION METHOD AND APPARATATUS AND STORAGE MEDIUM

CROSS-REFERENCE TO RELATED APPLICATION

This application is a U.S. national phase of International Application No. PCT/CN2019/116064, filed with the State Intellectual Property Office of P. R. China on Nov. 6, 2019.

TECHNICAL FIELD

The disclosure relates to a field of cellular communication technologies, and particularly to a data transmission method and apparatus, and a storage medium.

BACKGROUND

In a 5G NR (New Radio) system, a base station and a terminal may receive and send information using a beam. For example, a control signaling and business data interaction between the base station and the terminal may use the beam for reception and transmission.

When the base station and/or the terminal has a plurality of antenna panels, the beams on different antenna panels may be used to transmit data between the base station and the terminal. Taking a transmission of downlink data as an example, in the case that the base station has a plurality of antenna panels, the base station may send downlink data to the terminal using different antenna panels respectively and the downlink data may be sent in one beam direction on each antenna panel. That is, the downlink data is sent to the terminal through different sending beams respectively. Correspondingly, the terminal may use the receiving beams on different antenna panels to receive the downlink data sent by the terminal through the sending beams on different antenna panels respectively.

For a scene of multiple antenna panels, if the sending beam and receiving beam used by the base station and the terminal are mismatched, a failure may occur in reception of data, which may affect a success rate of data transmission.

SUMMARY

Embodiments of the disclosure provide a data transmission method and apparatus, and a storage medium. The technical solution will be described as follows.

According to a first aspect of the embodiments of the disclosure, a data transmission method is provided. The method includes: receiving by a terminal a media access control (MAC) signaling sent by a base station, in which the MAC signaling is configured to activate beam indication information respectively corresponding to m antenna panels, the beam indication information corresponding to an antenna panel is configured to indicate a beam used when the antenna panel is adopted to transmit data, the MAC signaling includes mapping information configured to indicate a correspondence between a beam indication codeword in downlink control information (DCI) and the activated beam indication information, where m is a positive integer; receiving by the terminal the DCI sent by the base station, in which the DCI includes a first beam indication codeword; determining by the terminal target beam indication information corresponding to a target antenna panel in the m antenna panels based on the first beam indication codeword and the mapping information; determining by the terminal a target beam used when the target antenna panel is adopted to transmit data based on the target beam indication information; and using by the terminal the target beam corresponding to the target antenna panel to transmit data with the base station.

According to a second aspect of the embodiments of the disclosure, a data transmission method is provided. The method includes: sending by a base station a media access control (MAC) signaling to a terminal, in which the MAC signaling is configured to activate beam indication information respectively corresponding to m antenna panels, the beam indication information corresponding to an antenna panel is configured to indicate a beam used when the antenna panel is adopted to transmit data, the MAC signaling includes mapping information configured to indicate a correspondence between a beam indication codeword in downlink control information (DCI) and the activated beam indication information, where m is a positive integer; and sending by the base station downlink control information (DCI) to the terminal, in which the DCI includes a first beam indication codeword, and the first beam indication codeword is configured to indicate target beam indication information corresponding to a target antenna panel in the m antenna panels.

According to a third aspect of the embodiments of the disclosure, a data transmission apparatus is provided. The apparatus is applied in a terminal and includes: a processor and a memory storing instructions executable by the processor. The processor is configured to receive a media access control (MAC) signaling sent by a base station, in which the MAC signaling is configured to activate beam indication information respectively corresponding to m antenna panels, the beam indication information corresponding to an antenna panel is configured to indicate a beam used when the antenna panel is adopted to transmit data, the MAC signaling includes mapping information configured to indicate a correspondence between a beam indication codeword in downlink control information (DCI) and the activated beam indication information, where m is a positive integer; receive the DCI sent by the base station, in which the DCI includes a first beam indication codeword; determine target beam indication information corresponding to a target antenna panel in the m antenna panels based on the first beam indication codeword and the mapping information; determine a target beam used when the target antenna panel is adopted to transmit data based on the target beam indication information; and use the target beam corresponding to the target antenna panel to transmit data with the base station.

According to a fourth aspect of the embodiments of the disclosure, a data transmission apparatus is provided. The apparatus is applied in a base station and includes: a processor and a memory storing instructions executable by the processor. The processor is configured to send a media access control (MAC) signaling to a terminal, in which the MAC signaling is configured to activate beam indication information respectively corresponding to m antenna panels, the beam indication information corresponding to an antenna panel is configured to indicate a beam used when the antenna panel is adopted to transmit data, the MAC signaling includes mapping information configured to indicate a correspondence between a beam indication codeword in downlink control information (DCI) and the activated beam indication information, where m is a positive integer; and send downlink control information (DCI) to the terminal, in which the DCI includes a first beam indication codeword, and the first beam indication codeword is configured to indicate target beam indication information corresponding to a target antenna panel in the m antenna panels.

It is to be understood that both the foregoing general description and the following detailed description are exemplary and explanatory only, and are not restrictive of the disclosure.

BRIEF DESCRIPTION OF THE DRAWINGS

The accompanying drawings, which are incorporated in and constitute a part of this specification, illustrate embodiments consistent with the disclosure, and serve to explain the principles of the disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

The network structure and business scenarios described in the embodiments of the present disclosure are used to better explain the technical solutions of the present disclosure, but not constructed to limit the technical solutions of the present disclosure. It would be appreciated by those skilled in the art that with the evolution of network structure and the emergence of new business scenarios, the technical solutions of the present disclosure may also be suitable to similar technical problems.

Figure 1:
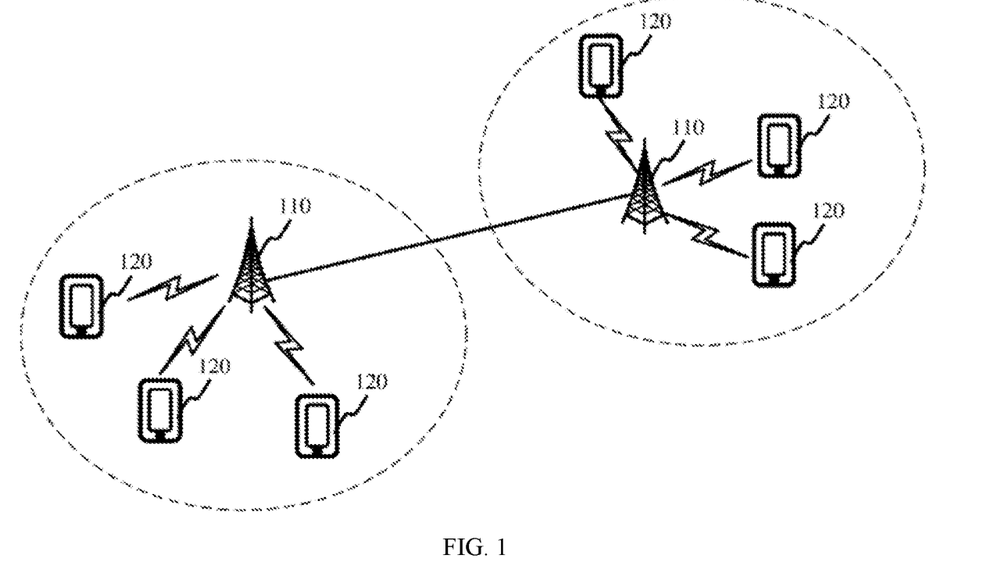
FIG. 1 is a schematic diagram illustrating a network architecture according to an embodiment.

FIG. 1 is a schematic diagram of a network structure according to an embodiment of the present disclosure. The network structure may include a base station 110 and a terminal 120.

The base station is deployed in an access network. The access network in the 5G NR system may be referred to as NG-RAN (New Generation-Radio Access Network). Communications between the base station 110 and the terminal 120 may be implemented by some new-radio techniques, for example a cellar network technique.

The base station 110 may be a device deployed in the access network and configured for providing a wireless communication function to the terminal 120. The base station 110 may include various forms of macro base stations, micro stations, relay stations, access points and so on.

In systems using different wireless access technologies, the device with the function of the base station may be designated differently, for example, gNodeB or gNB in the 5G NR system. With the evolution of communication technology, the designation "base station" may be changed. For ease of description, in the embodiments of the present disclosure, the above devices for providing the wireless communication function to the terminal 120 are collectively called "base station".

There may be multiple terminals 120. One or more terminals 120 may be disposed in a cell managed by the base station 110. The terminal 120 may include various handheld devices, vehicle-mounted devices, wearable devices, computing devices that have the wireless communication function or other processing devices connected to wireless modems, as well as various forms of user equipment (UEs), mobile stations (MSs), terminal devices and so on. For ease of description, in the embodiments of the present disclosure, the above mentioned devices are collectively called "terminal".

"5G NR system" in the embodiments of the present disclosure may also be called "5G system" or "NR system", which may be understood by those skilled in the art. The technical solutions described in the present disclosure may be suitable to the 5G NR system, or to a subsequent evolution system of the 5G NR system.

For a scenario in which that a signal antenna panel is used to send a physical downlink shared channel (PDSCH), a base station may indicate a receiving beam to a terminal as follows, the base station may inform the terminal of a plurality of (for example, at most 64 or 128) transmission configuration indicator (TCI) states through a radio resource control (RRC) signaling, and then the base station uses a MAC signaling to activate several (for example, at most eight) TCI states in the plurality of TCI states, and informs the terminal which TCI state of the several activated TCI states is used to receive the PDSCH through DCI. The TCI state informed through the DCI may be a transmission state configuration provided by the base station to terminal for PDSCH transmission, i.e., informing the terminal that the receiving beam used when downlink data on the PDSCH is received is the same as the receiving beam used to receive a reference signal (RS) corresponding to the TCI state. Then, the terminal may use the determined receiving beam to receive the downlink data on the PDSCH.

Each TCI state corresponds to one RS identification, which may also be called an RS index, configured to indicate the RS uniquely. Different RSs have different RS identifications. In an embodiment of the present disclosure, the RS may be a non-zero power ch5e1 state information reference signal (NZP CSI-RS), may also be a synchronization signal block (SSB), or may be other reference signals, which is not limited in the embodiment of the present disclosure. A correspondence between the TCI state and RS index may be shown in table-1, for example.

TABLE 1

| TCI state | RS index |
|---|---|
| TCI#0 | SSB index#1 |
| TCI#1 | SSB index#2 |
| TCI#2 | CSI-RS index#5 |
| TCI#3 | CSI-RS index#6 |
| TCI#4 | SSB index#3 |
| . . . | . . . |

Assume that the base station informs the terminal to use TCI #0 through the DCI, it indicates that the terminal is notified to use a receiving beam for receiving the SSB index #1 to receive the PDSCH.

For a scene of multiple antenna panels, the base station may have a plurality of antenna panels. The base station may send downlink data to the terminal through the sending beams on the plurality of antenna panels, and receive uplink data sent by the terminal through the receiving beams on the plurality of antenna panels. The plurality of antenna panels described above may belong to the same transmission reception point (TRP), or belong to different TRPs. In other words, one base station may have one or more TRPs, each TRP may have one or more antenna panels, different antenna panels correspond to different beam directions, and the same antenna panel may point to one beam direction at the same time. When each TRP has only one antenna panel, one antenna panel may be considered as one TRP.

Similarly, the terminal may have a plurality of antenna panels. The terminal may receive downlink data sent by the base station through the receiving beams on the plurality of antenna panels, and send uplink data to the base station through the sending beams on the plurality of antenna panels. Different antenna panels correspond to different beam directions, and the same antenna panel may point to one beam direction at the same time.

Taking a transmission of downlink data as an example, the base station may dynamically switch the antenna panel for sending the PDSCH to the same terminal. For example, the base station has two antenna panels: panel #1 and panel #2. The base station sends the PDSCH to a terminal using panel #1 within a certain time period, and then dynamically switch the antenna panel for sending the PDSCH to the terminal, for example the antenna panel is switched to panel #2 to send the PDSCH to the terminal, or the antenna panel is switched to panel #1 and panel #2 to simultaneously send the PDSCH to the terminal. After the antenna panel used by the base station to send the PDSCH to the same terminal is switched, if the terminal does not adjust the receiving beam for receiving the PDSCH, the sending beam and the receiving beam used by the base station and the terminal are mismatched, which may cause a failure in reception of data, thus affecting a success rate of data transmission. Similarly, the same problem may occur in the transmission of uplink data.

In the technical solution provided in the present disclosure, for a scene of multiple antenna panels, the base station sends the MAC signaling and DCI to the terminal to indicate the target beam used when the target antenna panel is adopted to transmit data to the terminal, so that the terminal may select the correct beam to transmit data for different antenna panels, thus improving a success rate of data transmission under the scene of multiple antenna panels. The technical solution provided in the present disclosure will be described through some embodiments below.

Figure 2:
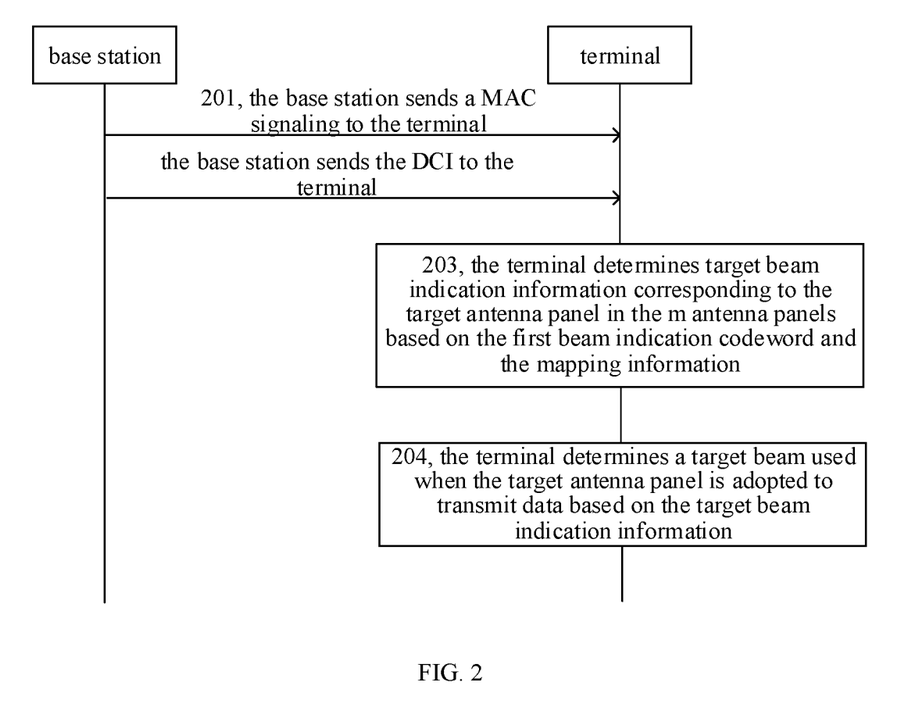
FIG. 2 is a flowchart illustrating a data transmission method according to an embodiment.

FIG. 2 is a flowchart illustrating a data transmission method according to an embodiment. The method may be applied in the network architecture illustrated in FIG. 1. The method may include the following blocks 201-205.

At block 201, the base station sends a MAC signaling to the terminal.

In the embodiment of the disclosure, the MAC signaling is configured to activate beam indication information respectively corresponding to m antenna panels, where m is a positive integer. Alternatively, the terminal includes a plurality of antenna panels. The MAC signaling is configured to activate beam indication information respectively corresponding to all or a part of the antenna panels of the terminal. For example, the terminal includes two antenna panels: panel #1 and panel #2. The MAC signaling sent by the base station to the terminal is configured to activate beam indication information respectively corresponding to panel #1 and panel #2. The above m antenna panels may belong to a same TRP, or may belong to a plurality of different TRPs. For example, the MAC signaling activates the beam indication information respectively corresponding to panel #1 and panel #2. Panel #1 and panel #2 may belong to a same TRP, or may belong to two different TRPs. Further, when each TRP has only one antenna panel, each antenna panel may be considered as corresponding to one TRP.

In an example, the MAC signaling activates the same number of pieces of beam indication information for each antenna panel. Taking a transmission of downlink data as an example, assuming that the MAC signaling activates beam indication information respectively corresponding to two antenna panels which are panel #1 and panel #2, the MAC signaling may activate four pieces of beam indication information corresponding to panel #1 and four pieces of beam indication information corresponding to panel #2. In another example, the MAC signaling activates different numbers of pieces of beam indication information for at least two antenna panels. Taking a transmission of downlink data as an example, assuming that the MAC signaling activates beam indication information respectively corresponding to two antenna panels which are panel #1 and panel #2, the MAC signaling may activate five pieces of beam indication information corresponding to panel #1 and three pieces of beam indication information corresponding to panel #2.

The beam indication information corresponding to an antenna panel is configured to indicate a beam used when the antenna panel is adopted to transmit data. In an example, the beam indication information is a TCI state. The TCI state corresponding to an antenna panel is configured to indicate a receiving beam used when the terminal adopts the antenna panel to receive downlink data. In some other examples, the TCI state may include a downlink TCI state and an uplink TCI state. The downlink TCI state corresponding to an antenna panel is configured to indicate a receiving beam used when the terminal adopts the antenna panel to receive downlink data. The uplink TCI state corresponding to an antenna panel is configured to indicate a sending beam used when the terminal adopts the antenna panel to send uplink data. In some other examples, in addition to the TCI state, the beam indication information may be other information, for example indication information for indicating an uplink sending beam, which is not limited in the embodiments of the disclosure.

Further, before the base station sends the MAC signaling to the terminal, the base station sends an RRC signaling to the terminal so as to inform the terminal of a plurality of pieces of beam indication information respectively corresponding to a plurality of antenna panels through the RRC signaling. The beam indication information corresponding to an antenna panel that is activated by the MAC signaling may be one or more of a plurality of pieces of beam indication information corresponding to the antenna panel informed in the RRC signaling. For example, the RRC signaling informs the terminal of 64 TCI states corresponding to panel #1 and 64 TCI states corresponding to panel #2. The MAC signaling activates four TCI states corresponding to panel #1 and four TCI states corresponding to panel #2. The four TCI states corresponding to panel #1 activated by the MAC signaling are four of the 64 TCI states corresponding to panel #1 informed in the RRC signaling. The four TCI states corresponding to panel #2 activated by the MAC signaling are four of the 64 TCI states corresponding to panel #2 informed in the RRC signaling.

In the embodiment of the disclosure, the MAC signaling includes mapping information configured to indicate a correspondence between a beam indication codeword in downlink control information (DCI) and the activated beam indication information. The beam indication codeword may be a binary character string, configured to indicate the beam indication information corresponding to the antenna panel. Regarding other description about the mapping information, reference can be made to the following embodiments.

In an example, the beam indication information of respective antenna panels is numbered jointly, i.e., the numbers of the beam indication information of respective antenna panels are non-repetitive. Taking a transmission of downlink data as an example, the terminal includes two antenna panels: panel #1 and panel #2. The numbers of TCI states corresponding to panel #1 are 0-63 while the numbers of TCI states corresponding to panel #2 are 64-127. Assuming that the MAC signaling activates eight TCI states, in which the TCI states corresponding to panel #1 include TCI #3, TCI #10, TCI #13 and TCI #15, while the TCI states corresponding to panel #2 include TCI #(N+1), TCI #(N+5), TCI #(N+7) and TCI #(N+9), then N equals to 64. When the numbers of TCI states corresponding to panel #1 are 0-127 while the numbers of TCI states corresponding to panel #2 are 128-255, N equals to 128.

In another example, the beam indication information of respective antenna panels is numbered independently, i.e., the numbers of the beam indication information of respective antenna panels may be repetitive. Taking a transmission of downlink data as an example, the terminal includes two antenna panels: panel #1 and panel #2. The numbers of TCI states corresponding to panel #1 are 0-63 and the numbers of TCI states corresponding to panel #2 are also 0-63. Assume that the MAC signaling activates eight TCI states, in which the TCI states corresponding to panel #1 include TCI #3, TCI #10, TCI #13 and TCI #15, while the TCI states corresponding to panel #2 include TCI #1, TCI #5, TCI #7 and TCI #9.

It should be noted that, if the beam indication information of respective antenna panels is numbered jointly, when configuring the TCI states corresponding to respective antenna panels, the RRC signaling needs to indicate the antenna panel corresponding to the informed TCI state, and the MAC signaling needs to indicate the antenna panel corresponding to the activated TCI state, i.e., indicating the antenna panel to which the activated TCI state belongs. For example, the MAC signaling includes a correspondence between identification information of the antenna panel and the activated information of the antenna panel. The activated information is configured to activate the beam indication information corresponding to the antenna panel.

At block 202, the base station sends the DCI to the terminal.

In the embodiment of the disclosure, the DCI includes a first beam indication codeword. The first beam indication codeword is configured to indicate target beam indication information corresponding to a target antenna panel in the activated m antenna panels. The target antenna panel may be one of the m antenna panels, or may be multiple antenna panels of the m antenna panels. For example, the MAC signaling activates the TCI states respectively corresponding to panel #1 and panel #2, the DCI signaling may only indicate a target TCI state corresponding to panel #1, or may only indicate a target TCI state corresponding to panel #2, or may indicate target TCI states respectively corresponding to panel #1 and panel #2.

In the embodiment of the disclosure, since the antenna panel used to transmit data may be dynamically switched, i.e., the antenna panel used to transmit data may be switched at any time, it is suitable to use the DCI to indicate the target antenna panel after switching and the target beam corresponding to the target antenna panel, because the DCI may be sent at a short interval, for example, may be sent every several time slots. Even when the antenna panel is switched frequently, the DCI may be used to correctly indicate the target antenna panel after switching and the target beam. The MAC signaling always activates multiple antenna panels, so that there is no need to send the MAC signaling repeatedly during the dynamic switching of the antenna panel, thus facilitating saving overhead of signaling. When the antenna panel used to transmit data is switched, the base station only needs to send the DCI to the terminal, so as to indicate to the terminal the target antenna panel after switching and the target beam corresponding to the target antenna panel through the DCI.

At block 203, the terminal determines target beam indication information corresponding to the target antenna panel in the m antenna panels based on the first beam indication codeword and the mapping information.

As described above, the mapping information is included in the MAC signaling, and configured to indicate the correspondence between the beam indication codeword and the beam indication information. After obtaining the first beam indication codeword in the DCI, the terminal searches in the mapping information for the beam indication information corresponding to the first beam indication codeword based on the first beam indication codeword and determines the beam indication information as the target beam indication information corresponding to the target antenna panel in the m antenna panels.

Alternatively, the MAC signaling activates the beam indication information respectively corresponding to two antenna panels which includes a first antenna panel and a second antenna panel: panel #1 and panel #2. In a possible implementation, a first partial beam indication codeword in the mapping information is configured to indicate the beam indication information corresponding to the first antenna panel, and the number of codewords included in the first partial beam indication codeword is an integer greater than or equal to 0. A second partial beam indication codeword in the mapping information is configured to indicate the beam indication information corresponding to the second antenna panel, and the number of codewords included in the second partial beam indication codeword is an integer greater than or equal to 0. A third partial beam indication codeword in the mapping information is configured to indicate the beam indication information corresponding to the first antenna panel and the beam indication information corresponding to the second antenna panel, and the number of codewords included in the third partial beam indication codeword is an integer greater than or equal to 0.

For example, the beam indication codeword is represented by three bits. The beam indication information is the TCI state. The correspondence indicated by the mapping information may be shown in Table-2. Here, the TCI states of two antenna panels are numbered jointly.

TABLE 2

| Beam indication codeword | Number of TCI state |
|---|---|
| 000 | TCI#3 |
| 001 | TCI#65 |
| 010 | TCI#10 |
| 011 | TCI#69 |
| 100 | TCI#3 & TCI#65 |
| 101 | TCI#10 & TCI#69 |
| 110 | TCI#13 & TCI#71 |
| 111 | TCI#15 & TCI#73 |

The first partial beam indication codeword includes 000 and 010. The two beam indication codewords are respectively used to indicate the TCI states corresponding to panel #1. The second partial beam indication codeword includes 001 and 011. The two beam indication codewords are respectively used to indicate the TCI states corresponding to panel #2. The third partial beam indication codeword includes 100, 101, 110 and 111. The four beam indication codewords are respectively used to indicate the combinations of TCI states, and each combination of TCI states includes one TCI state corresponding to panel #1 and one TCI state corresponding to panel #2.

After receiving the DCI sent by the base station and reading the first beam indication codeword from the DCI, the terminal queries the mapping information shown in Table-2, and determines the target antenna panel indicated by the base station and the target TCI state corresponding to the target antenna panel by combining the TCI states corresponding the m antenna panels activated by the MAC signaling. In addition, in the above example, the beam indication codeword has three bits, however, the number of bits of the beam indication codeword may be greater than or equal to 3 or less than 3. Assuming that there are two antenna panels: panel #1 and panel #2, and each antenna panel has four TCI states activated by the MAC signaling, the target TCI state corresponding to panel #1 indicated by the beam indication codeword may have four cases, the target TCI state corresponding to panel #2 indicated by the beam indication codeword may have four cases, and the target TCI state corresponding to panel #2 indicated by the beam indication codeword may have 4*4=16 cases, i.e., a total of 4+4+16=24 cases. If the number of bits in the beam indication codeword is five, then the mapping information may include all the 24 cases. If the number of bits in the beam indication codeword is less than five, then a certain number of cases may be selected from the 24 cases and saved in the mapping information, the certain number corresponds to the number of states that the beam indication codeword can indicate (i.e., if the beam indication codeword has N bits, the number of states that the beam indication codeword can indicate is Nth power of 2). For example, if the beam indication codeword has four bits, 16 cases can be selected from the 24 cases and saved in the mapping information. If the beam indication codeword has three bits, 8 cases can be selected from the 24 cases and saved in the mapping information. If the beam indication codeword has two bits, 4 cases can be selected from the 24 cases and saved in the mapping information.

At block 204, the terminal determines a target beam used when the target antenna panel is adopted to transmit data based on the target beam indication information.

Still referring to the above example, assuming that the beam indication codeword included in the DCI is 000, the terminal determines that the TCI state corresponding to the beam indication codeword 000 has a number of TCI #3.

Since TCI #3 is the TCI state corresponding to panel #1, and assuming that the RS index corresponding to TCI #3 is CSI-RS index #6, the terminal determines that the receiving beam used when panel #1 is adopted to receive CSI-RS index #6 as the target receiving beam for panel #1 to receive downlink data.

For another example, assuming that the beam indication codeword included in the DCI is 100, the terminal determines that the TCI states corresponding to the beam indication codeword 100 have numbers of TCI #3 and TCI #65. Since TCI #3 is the TCI state corresponding to panel #1 and TCI #65 is the TCI state corresponding to panel #2, and assuming that the RS index corresponding to TCI #3 is CSI-RS index #6 and the RS index corresponding to TCI #65 is SSB index #2, the terminal determines that the receiving beam used when panel #1 is adopted to receive CSI-RS index #6 as the target receiving beam for panel #1 to receive downlink data, and the receiving beam used when panel #2 is adopted to receive SSB index #2 as the target receiving beam for panel #2 to receive downlink data.

At block 205, the terminal uses the target beam corresponding to the target antenna panel to transmit data with the base station.

In a scene of downlink transmission, when the beam indication information is the TCI state, the terminal determines the target receiving beam used when the target antenna panel is adopted to receive downlink data based on the target TCI state corresponding to the target antenna panel, and uses the target receiving beam corresponding to the target antenna panel to receive the downlink data.

In a scene of uplink transmission, when the beam indication information is the TCI state or another uplink beam indication information, the terminal determines the target sending beam used when the target antenna panel is adopted to send uplink data based on the target TCI state or the target uplink beam corresponding to the target antenna panel, and uses the target sending beam corresponding to the target antenna panel to send the uplink data.

In conclusion, in the technical solution provided in the embodiments of the disclosure, for a scene of multiple antenna panels, the base station sends the MAC signaling and DCI to the terminal to indicate the target beam used when the target antenna panel is adopted to transmit data to the terminal, so that the terminal may select the correct beam to transmit data for different antenna panels, thus improving a success rate of data transmission under the scene of multiple antenna panels.

Further, according to the technical solution provided in the embodiments of the present disclosure, the data transmission may be performed by simultaneously using a plurality of beams between the terminal and the base station, which may improve robustness of communication.

In a possible implementation, the number of pieces of the beam indication information activated by the above MAC signaling is k, where k is a positive integer. The mapping information includes k redefining numbers from 0 to k−1, and the k redefining numbers have a one-to-one correspondence with k pieces of beam indication information activated by the MAC signaling.

The redefining numbers are numbers redefined for the k pieces of beam indication information based on initial numbers of the k pieces of beam indication information. For example, when k equals to 8, i.e., the MAC signaling activates eight pieces of beam indication information, the mapping information includes eight redefining numbers from 0-7, and the eight redefining numbers have a one-to-one correspondence with the above eight pieces of beam indication information.

For example, the beam indication codeword has three bits, the correspondence between the beam indication code and the redefining number may be shown in Table-3.

TABLE 3

| Beam indication codeword | Redefining number |
|---|---|
| 000 | TCI#0 |
| 001 | TCI#4 |
| 010 | TCI#1 |
| 011 | TCI#5 |
| 100 | TCI#0 & TCI#4 |
| 101 | TCI#1 & TCI#5 |
| 110 | TCI#2 & TCI#6 |
| 111 | TCI#3 & TCI#7 |

In the embodiment of the disclosure, the initial numbers of the beam indication information of them antenna panels indicated by the MAC signaling may be numbered jointly or independently.

For example, the initial numbers of the beam indication information of the m antenna panels are numbered jointly. In this case, after the k pieces of beam indication information activated by the MAC signaling are ordered based on a first rule, the k pieces of beam indication information have the one-to-one correspondence with the k redefining numbers. The first rule indicates ordering based on the initial numbers from small to big or from big to small. For example, the MAC signaling activates the TCI states respectively corresponding to panel #1 and panel #2, and the initial numbers of the TCI states respectively corresponding to panel #1 and panel #2 are numbered jointly. Assuming that the initial numbers of the TCI states corresponding to panel #1 are TCI #0-TCI #63 while the initial numbers of the TCI states corresponding to panel #2 are TCI #64-TCI #127, the MAC signaling activates eight TCI states, including TCI #3, TCI #10, TCI #13, TCI #15, TCI #65, TCI #69, TCI #71 and TCI #73. The eight TCI states are ordered based on the initial numbers from small to big, and the redefining numbers respectively corresponding to the eight TCI states are determined, i.e., TCI #3 corresponds to TCI #0, TCI #10 corresponds to TCI #1, TCI #13 corresponds to TCI #2, TCI #15 corresponds to TCI #3, TCI #65 corresponds to TCI #4, TCI #69 corresponds to TCI #5, TCI #71 corresponds to TCI #6, TCI #73 corresponds to TCI #7.

For example, the initial numbers of the beam indication information of the m antenna panels are numbered independently. In this case, after the k pieces of beam indication information activated by the MAC signaling are ordered based on a second rule, the k pieces of beam indication information have the one-to-one correspondence with the k redefining numbers. The second rule indicates ordering the beam indication information of the m antenna panels based on identification information of the m antenna panels, in which the identification information of the m antenna panels are ordered from big to small or from small to big and the beam indication information of a same antenna panel is ordered based on the initial numbers from small to big or from big to small. For example, the MAC signaling activates the TCI states respectively corresponding to panel #1 and panel #2, and the initial numbers of the TCI states respectively corresponding to panel #1 and panel #2 are numbered independently. Assuming that the initial numbers of the TCI states corresponding to panel #1 are TCI #0-TCI #63 and the initial numbers of the TCI states corresponding to panel #2 are also TCI #0-TCI #63, the MAC signaling activates eight TCI states, including TCI #3, TCI #10, TCI #13, TCI #15 corresponding to panel #1, and TCI #1, TCI #5, TCI #7 and TCI #9 corresponding to panel #2. The two antenna panels are ordered based on the identification information of the antenna panels from small to big, i.e., panel #1 is the first and panel #2 is the second. The TCI states corresponding to the same antenna panel are ordered based on the initial numbers from small to big, i.e., TCI #3, TCI #10, TCI #13, TCI #15 of panel #1 and TCI #1, TCI #5, TCI #7 and TCI #9 of panel #2. The redefining numbers respectively corresponding to the eight TCI states are determined, i.e., TCI #3, TCI #10, TCI #13, TCI #15 of panel #1 respectively correspond to TCI #0, TCI #1, TCI #2, and TCI #3, TCI #1, TCI #5, TCI #7 and TCI #9 of panel #2 respectively correspond to TCI #4, TCI #5, TCI #6, and TCI #7.

It should be noted that, the identification information of the antenna panel is configured to uniquely identify the antenna panel. Different antenna panels have different identification information. Further, when each TRP corresponds to one antenna panel, the identification information of the antenna panel is identification information of the TRP. The identification information of the TRP may be represented by a higher layer signaling index sent by the base station.

It should be noted that, in the mapping information included in the MAC signaling, each beam indication codeword may correspond to one or more TCI states. For example, when the MAC signaling activates the TCI states respectively corresponding to two antenna panels, each beam indication codeword in the mapping information may correspond to one or two TCI states. When the beam indication codeword corresponds to multiple TCI states, different TCI states correspond to different antenna panels. In other words, for the ith beam indication codeword in the mapping information, when the number of pieces of beam indication information corresponding to the ith beam indication codeword is a and a is greater than 1, the a pieces of beam indication information correspond to a different antenna panels, where i is a positive integer. Each beam indication codeword in the mapping information may correspond to one or more pieces of beam indication information. When the beam indication codeword corresponds to multiple pieces of beam indication information, the multiple pieces of beam indication information correspond to different antenna panels. For example, for the first beam indication codeword in the mapping information, when the number of pieces of beam indication information corresponding to the first beam indication codeword is two, the two pieces of beam indication information correspond to two different antenna panels, i.e., one piece of beam indication information corresponds to panel #1, another piece of beam indication information corresponds to panel #2.

A design of the mapping information included in the MAC signaling will be described below.

In a possible design, in the mapping information, the number indication codeword corresponding to each beam indication codeword has k bits, and each bit in the k bits corresponds to one of the activated k pieces of beam indication information. The number indication codeword is a codeword configured to indicate the redefining number.

Alternatively, the highest bit in the k bits corresponds to the smallest redefining number, and the lowest bit corresponds to the biggest redefining number. Or the highest bit in the k bits corresponds to the biggest redefining number, and the lowest bit corresponds to the smallest redefining number. Further, since the mapping information include k beam indication codewords, and the number indication codeword corresponds to each beam indication codeword has k bits, the MAC signaling needs to use k k-bits to represent the mapping information.

Figure 3:
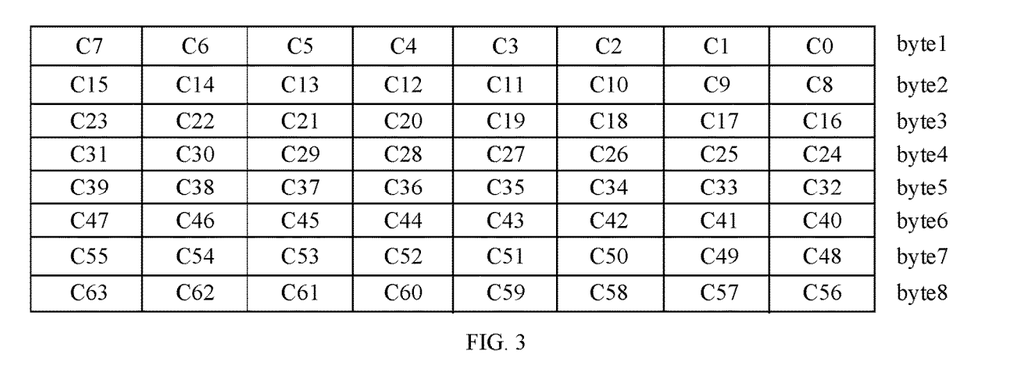
FIG. 3 is schematic diagrams illustrating mapping information according to an embodiment.

For example, as illustrated in FIG. 3, since the beam indication codeword has three bits, eight kinds of beam indication information can be indicated, such that the mapping information carried in the MAC signaling includes eight 8-bits. The first 8-bit C0-C7 indicates the beam indication information when the beam indication codeword is 000. The second 8-bit C8-C15 indicates the beam indication information when the beam indication codeword is 001. The third 8-bit C16-C23 indicates the beam indication information when the beam indication codeword is 010. The fourth 8-bit C24-C31 indicates the beam indication information when the beam indication codeword is 011. The fifth 8-bit C32-C39 indicates the beam indication information when the beam indication codeword is 100. The sixth 8-bit C40-C47 indicates the beam indication information when the beam indication codeword is 101. The seventh 8-bit C48-C55 indicates the beam indication information when the beam indication codeword is 110. The eighth 8-bit C56-C63 indicates the beam indication information when the beam indication codeword is 111. Alternatively, in each 8-bit, the redefining number corresponding to the highest bit is TCI #0, and the redefining number corresponding to the lowest bit is TCI #7. For example, the first 8-bit is "10000000", and the redefining number corresponding to first 8-bit is TCI #0. For another example, the fifth 8-bit is "10001000", and the redefining numbers corresponding to fifth 8-bit are TCI #0 and TCI #4.

In another possible design, in the mapping information, the number indication codeword corresponding to each beam indication codeword has r bits, and each number indication codeword indicates one or more of the activated k pieces of beam indication information. The number indication codeword is a codeword configured to indicate the redefining number, where r is a positive integer.

Since the mapping information includes k beam indication codewords, and the number indication codeword corresponds to each beam indication codeword has r bits, the MAC signaling needs to use k r-bits to represent the mapping information. Alternatively, the value of r meets $2^{r-1} < C_k^1 + C_k^2 + \ldots + C_k^m \leq 2^r$, where m is the number of antenna panels corresponding to the beam indication information activated by the MAC signaling, i.e., the above mentioned m. For example, when k=8 and m=2, each number indication codeword indicates one or two of the activated eight pieces of beam indication information, such that there may be $C_8^1 + C_8^2 = 8 + 28 = 36$ cases, and r equals to 6.

Figure 4:
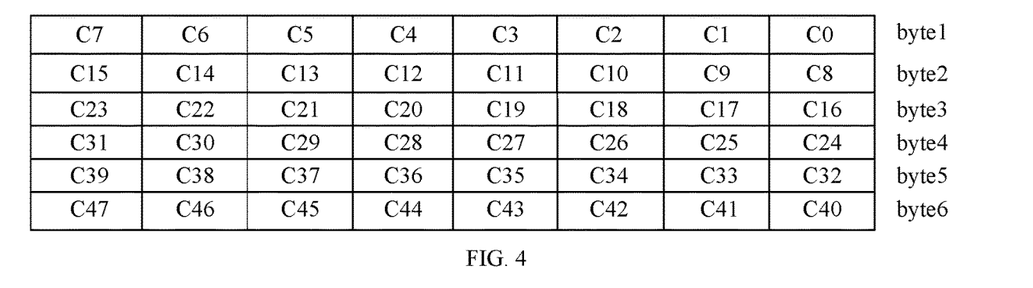
FIG. 4 is a schematic diagram illustrating mapping information according to another embodiment.

For example, as illustrated in FIG. 4, since the beam indication codeword has three bits, eight kinds of beam indication information can be indicated, such that the mapping information carried in the MAC signaling includes eight 6-bits. The first 6-bit C0-C5 indicates the beam indication information when the beam indication codeword is 000. The second 6-bit C6-C11 indicates the beam indication information when the beam indication codeword is 001. The third 6-bit C12-C17 indicates the beam indication information when the beam indication codeword is 010. The fourth 6-bit C18-C23 indicates the beam indication information when the beam indication codeword is 011. The fifth 6-bit C24-C29 indicates the beam indication information when the beam indication codeword is 100. The sixth 6-bit C30-C35 indicates the beam indication information when the beam indication codeword is 101. The seventh 6-bit C36-C41 indicates the beam indication information when the beam indication codeword is 110. The eighth 6-bit C42-C47 indicates the beam indication information when the beam indication codeword is 111. Further, each 6-bit, i.e., the correspondence between the number indication codeword and the redefining number needs to predefined, for example, the correspondence shown in Table-4 may be predefined.

TABLE 4

| Number indication codeword | Redefining number |
|---|---|
| 000000 | TCI#0 |
| 000001 | TCI#1 |
| 000010 | TCI#2 |
| 000011 | TCI#3 |
| 000100 | TCI#4 |
| 000101 | TCI#5 |
| 000110 | TCI#6 |
| 000111 | TCI#7 |
| 001000 | TCI#0 and TCI#7 |
| 001001 | TCI#1 and TCI#7 |
| 001010 | TCI#2 and TCI#7 |
| 001011 | TCI#3 and TCI#7 |
| 001100 | TCI#4 and TCI#7 |
| . . . | . . . |
| 100100 | TCI#3 and TCI#4 |
| 100101 | reserved |
| . . . | reserved |
| . . . | reserved |
| 111111 | reserved |

The correspondence between the number indication codeword and the redefining number shown in FIG. 4 is predefined and saved in the terminal and the base station.

In this way, the terminal may define the target beam indication information corresponding to the target antenna panel in the m antenna panels as follows.

1, the terminal obtains a first number indication codeword from the mapping information.

The first number indication codeword is a number indication codeword corresponding to the first beam indication codeword. The mapping information includes a correspondence between beam indication codewords and number indication codewords. The number indication codeword is a codeword configured to indicate the redefining number.

2, the terminal determines a first redefining number indicated by the first number indication codeword.

3, the terminal determines beam indication information corresponding to the first redefining number to obtain the target antenna panel and the target beam indication information.

For example, the first beam indication codeword included in the DCI received by the terminal is 000, the terminal obtains the first number indication codeword 10000000 corresponding to the first beam indication codeword 000 from the mapping information. If the redefining number corresponding to the first number indication codeword 10000000 is TCI #0, and the initial number corresponding to TCI #0 is TCI #3, assuming that the RS index corresponds to TCI #3 is CSI-RS index #6, the terminal determines the receiving beam used when panel #1 is adopted to receive CSI-RS index #6 as the target receiving beam for panel #1 to receive the downlink data.

Alternatively, the MAC signaling is further configured to update one or both of the activated beam indication information and the mapping information. In other words, the activated beam indication information and the mapping information may be updated simultaneously, or only one of the activated beam indication information and the mapping information is updated. If a new MAC signaling only carries the mapping information, the activated beam indication information sent through the latest MAC signaling may be continually used. If a new MAC signaling only carries the activated beam indication information, the mapping information sent through the latest MAC signaling may be continually used.

For example, the base station sends two MAC signalings to the terminal in sequence, including a first MAC signaling and a second signaling. Assuming that the activated beam indication information in the first MAC signaling includes TCI #3, TCI #10, TCI #13, TCI #15, TCI #65, TCI #69, TCI #71 and TCI #73, and the mapping information included in the MAC signaling indicates the correspondence as shown in Table-3. The second MAC signaling does not update the activated beam indication information, but only updates the mapping information. The updated mapping information indicates the correspondences as shown in Table-5.

TABLE 5

| beam indication codeword | redefining number |
| --- | --- |
| 000 | TCI#2 |
| 001 | TCI#6 |
| 010 | TCI#3 |
| 011 | TCI#7 |
| 100 | TCI#0 & TCI#4 |
| 101 | TCI#1 & TCI#5 |
| 110 | TCI#2 & TCI#6 |
| 111 | TCI#3 & TCI#7 |

When the activated beam indication information is not updated but the mapping information is updated, the correspondence between the beam indication codeword and the beam indication information is updated. Assuming that the MAC signaling activates eight TCI states TCI #3, TCI #10, TCI #13, TCI #15, TCI #65, TCI #69, TCI #71 and TCI #73, respectively, and the corresponding redefining numbers are TCI #0, TCI #1, TCI #2, TCI #3, TCI #4, TCI #5, TCI #6 and TCI #7, respectively. Based on the mapping information shown in Table-3, the redefining number corresponding to the beam indication codeword 000 is TCI #0, and the TCI state corresponding to TCI #0 is TCI #3. Based on the updated mapping information shown in Table-5, the redefining number corresponding to the beam indication codeword 000 is TCI #2, and the TCI state corresponding to TCI #2 is TCI #13.

In conclusion, in the technical solution provided in the embodiments of the disclosure, the beam indication information activated by the MAC signaling is redefined with the redefining number, so that the mapping information included in the MAC signaling only needs to indicate the redefining number, thus saving overhead of signaling required by the mapping information.

Further, the embodiments of the disclosure provide two designs of the mapping information included in the MAC signaling. In practice, the design of the mapping information may be selected according to actual situations, for example selecting the design with smaller overhead, thus improving the flexibility.

The above method embodiments are described from the perspective of interaction between the terminal and the base station, but the above steps related to the terminal may be implemented as a data transmission method at the terminal side, and the steps related to the base station may be implemented as a data transmission method at the base station side.

The apparatus embodiments will be described below, which may be used to perform the above method embodiments. For details not described in the apparatus embodiments, reference can be made to the above method embodiments.

Figure 5:
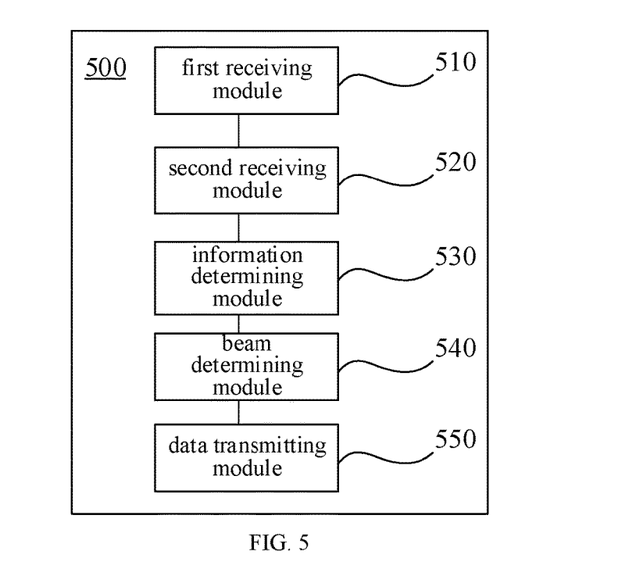
FIG. 5 is a block diagram illustrating a data transmission apparatus according to an embodiment.

FIG. 5 is a block diagram of a data transmission apparatus according to an embodiment of the present disclosure. The apparatus has a function capable to implement the above method at the terminal side, the function may be implemented by hardware, or by software corresponding to the hardware. The apparatus may be the terminal described above, or may be configured in the terminal. The apparatus 500 may include: a first receiving module 510, a second receiving module 520, an information determining module 530, a beam determining module 540 and a data transmitting module 550.

The first receiving module 510 is configured to receive a media access control (MAC) signaling sent by a base station, in which the MAC signaling is configured to activate beam indication information respectively corresponding to m antenna panels, the beam indication information corresponding to an antenna panel is configured to indicate a beam used when the antenna panel is adopted to transmit data, the MAC signaling includes mapping information configured to indicate a correspondence between a beam indication codeword in downlink control information (DCI) and the activated beam indication information, where m is a positive integer.

The second receiving module 520 is configured to receive the DCI sent by the base station, in which the DCI includes a first beam indication codeword.

The information determining module 530 is configured to determine target beam indication information corresponding to a target antenna panel in the m antenna panels based on the first beam indication codeword and the mapping information;

The beam determining module 540 is configured to determine a target beam used when the target antenna panel is adopted to transmit data based on the target beam indication information.

The data transmitting module 550 is configured to use the target beam corresponding to the target antenna panel to transmit data with the base station.

Alternatively, a number of pieces of the beam indication information activated by the MAC signaling is k, where k is a positive integer. The mapping information includes k redefining numbers from 0 to k−1, and the k redefining numbers have a one-to-one correspondence with k pieces of beam indication information activated by the MAC signaling.

Alternatively, in the mapping information, a number indication codeword corresponding to a beam indication codeword has k bits, and each bit in the k bits corresponds to one of the activated k pieces of beam indication information. The number indication codeword is a codeword configured to indicate the redefining number.

Alternatively, in the mapping information, a number indication codeword corresponding to a beam indication codeword has r bits, and each number indication codeword indicates one or more of the activated k pieces of beam indication information. The number indication codeword is a codeword configured to indicate the redefining number, where r is a positive integer.

Alternatively, for an ith beam indication codeword in the mapping information, when a number of pieces of beam indication information corresponding to the ith beam indication codeword is a and a is greater than 1, the a pieces of beam indication information correspond to a different antenna panels, where i is a positive integer.

Alternatively, the information determining module 530 is configured to: obtain a first number indication codeword from the mapping information, in which the first number indication codeword is a number indication codeword corresponding to the first beam indication codeword, and the mapping information includes a correspondence between beam indication codewords and number indication codewords, the number indication codeword is a codeword configured to indicate the redefining number; determine a first redefining number indicated by the first number indication codeword; and determine beam indication information corresponding to the first redefining number to obtain the target antenna panel and the target beam indication information.

Alternatively, initial numbers of the beam indication information of the m antenna panels are numbered jointly. After the k pieces of beam indication information activated by the MAC signaling are ordered based on a first rule, the k pieces of beam indication information have the one-to-one correspondence with the k redefining numbers. The first rule indicates ordering based on the initial numbers from small to big or from big to small.

Alternatively, initial numbers of the beam indication information of the m antenna panels are numbered independently. After the k pieces of beam indication information activated by the MAC signaling are ordered based on a second rule, the k pieces of beam indication information have the one-to-one correspondence with the k redefining numbers. The second rule indicates ordering the beam indication information of the m antenna panels based on identification information of the m antenna panels, in which the identification information of the m antenna panels are ordered from big to small or from small to big and the beam indication information of a same antenna panel is ordered based on the initial numbers from small to big or from big to small.

Alternatively, the MAC signaling activates the same number of pieces of beam indication information for each antenna panel; or the MAC signaling activates different numbers of pieces of beam indication information for at least two antenna panels.

Alternatively, the MAC signaling is further configured to update one or both of the activated beam indication information and the mapping information.

In conclusion, for a scene of multiple antenna panels, the base station sends the MAC signaling and DCI to the terminal to indicate the target beam used when the target antenna panel is adopted to transmit data to the terminal, so that the terminal may select the correct beam to transmit data for different antenna panels, thus improving a success rate of data transmission under the scene of multiple antenna panels.

Further, according to the technical solution provided in the embodiments of the present disclosure, the data transmission may be performed by simultaneously using a plurality of beams between the terminal and the base station, which may improve robustness of communication.

Figure 6:
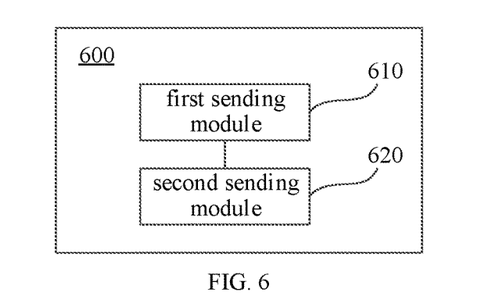
FIG. 6 is a block diagram illustrating a data transmission apparatus according to an embodiment.

FIG. 6 is a block diagram of a data transmission apparatus according to an embodiment of the present disclosure. The apparatus has a function capable to implement the above method at the base station side, the function may be implemented by hardware, or by software corresponding to the hardware. The apparatus may be the base station described above, or may be configured in the base station. The apparatus 600 may include a first sending module 610 and a second sending module 620.

The first sending module 610 is configured to send a media access control (MAC) signaling to a terminal, in which the MAC signaling is configured to activate beam indication information respectively corresponding to m antenna panels, the beam indication information corresponding to an antenna panel is configured to indicate a beam used when the antenna panel is adopted to transmit data, the MAC signaling includes mapping information configured to indicate a correspondence between a beam indication codeword in downlink control information (DCI) and the activated beam indication information, where m is a positive integer.

The second sending module 620 is configured to send downlink control information (DCI) to the terminal, in which the DCI includes a first beam indication codeword, and the first beam indication codeword is configured to indicate target beam indication information corresponding to a target antenna panel in the m antenna panels.

In conclusion, for a scene of multiple antenna panels, the base station sends the MAC signaling and DCI to the terminal to indicate the target beam used when the target antenna panel is adopted to transmit data to the terminal, so that the terminal may select the correct beam to transmit data for different antenna panels, thus improving a success rate of data transmission under the scene of multiple antenna panels.

Further, according to the technical solution provided in the embodiments of the present disclosure, the data transmission may be performed by simultaneously using a plurality of beams between the terminal and the base station, which may improve robustness of communication.

It should be noted that the division of modules in the above apparatus that is taken when implementing the functions is only for illustration. In actual applications, the functions may be assigned to different modules for implementation according to requirements, i.e., the apparatus may be divided into different modules so as to complete all or part of functions described above.

With respect to the apparatus according to the embodiment described above, the ways to perform operations by respective modules have been described in the associated method embodiments, which are not described here.

Embodiments of the present disclosure further provide a data transmission apparatus, which may implement the data transmission method at the terminal side provided in the present disclosure. The apparatus may be the terminal described above or may be configured in the terminal. The apparatus includes a processor and a memory configured to store instructions executable by the processor.

The processor is configured to receive a media access control (MAC) signaling sent by a base station, in which the MAC signaling is configured to activate beam indication information respectively corresponding to m antenna panels, the beam indication information corresponding to an antenna panel is configured to indicate a beam used when the antenna panel is adopted to transmit data, the MAC signaling includes mapping information configured to indicate a correspondence between a beam indication codeword in downlink control information (DCI) and the activated beam indication information, where m is a positive integer; receive the DCI sent by the base station, in which the DCI includes a first beam indication codeword; determine target beam indication information corresponding to a target antenna panel in the m antenna panels based on the first beam indication codeword and the mapping information; determine a target beam used when the target antenna panel is adopted to transmit data based on the target beam indication information; and use the target beam corresponding to the target antenna panel to transmit data with the base station.

Alternatively, a number of pieces of the beam indication information activated by the MAC signaling is k, where k is a positive integer. The mapping information includes k redefining numbers from 0 to k−1, and the k redefining numbers have a one-to-one correspondence with k pieces of beam indication information activated by the MAC signaling.

Alternatively, in the mapping information, a number indication codeword corresponding to a beam indication codeword has k bits, and each bit in the k bits corresponds to one of the activated k pieces of beam indication information. The number indication codeword is a codeword configured to indicate the redefining number.

Alternatively, in the mapping information, a number indication codeword corresponding to a beam indication codeword has r bits, and each number indication codeword indicates one or more of the activated k pieces of beam indication information. The number indication codeword is a codeword configured to indicate the redefining number, where r is a positive integer.

Alternatively, for an ith beam indication codeword in the mapping information, when a number of pieces of beam indication information corresponding to the ith beam indication codeword is a and a is greater than 1, the a pieces of beam indication information correspond to a different antenna panels, where i is a positive integer.

Alternatively, the processor is further configured to: obtain a first number indication codeword from the mapping information, in which the first number indication codeword is a number indication codeword corresponding to the first beam indication codeword, and the mapping information includes a correspondence between beam indication codewords and number indication codewords, the number indication codeword is a codeword configured to indicate the redefining number; determine a first redefining number indicated by the first number indication codeword; and determine beam indication information corresponding to the first redefining number to obtain the target antenna panel and the target beam indication information.

Alternatively, initial numbers of the beam indication information of the m antenna panels are numbered jointly. After the k pieces of beam indication information activated by the MAC signaling are ordered based on a first rule, the k pieces of beam indication information have the one-to-one correspondence with the k redefining numbers. The first rule indicates ordering based on the initial numbers from small to big or from big to small.

Alternatively, initial numbers of the beam indication information of the m antenna panels are numbered independently. After the k pieces of beam indication information activated by the MAC signaling are ordered based on a second rule, the k pieces of beam indication information have the one-to-one correspondence with the k redefining numbers. The second rule indicates ordering the beam indication information of the m antenna panels based on identification information of the m antenna panels, in which the identification information of the m antenna panels are ordered from big to small or from small to big and the beam indication information of a same antenna panel is ordered based on the initial numbers from small to big or from big to small.

Alternatively, the MAC signaling activates the same number of pieces of beam indication information for each antenna panel; or the MAC signaling activates different numbers of pieces of beam indication information for at least two antenna panels.

Alternatively, the MAC signaling is further configured to update one or both of the activated beam indication information and the mapping information.

Embodiments of the present disclosure further provide a data transmission apparatus, which may implement the data transmission method at the base station side provided in the present disclosure. The apparatus may be the base station described above or may be configured in the base station. The apparatus includes a processor and a memory configured to store instructions executable by the processor.

The processor is configured to send a media access control (MAC) signaling to a terminal, in which the MAC signaling is configured to activate beam indication information respectively corresponding to m antenna panels, the beam indication information corresponding to an antenna panel is configured to indicate a beam used when the antenna panel is adopted to transmit data, the MAC signaling includes mapping information configured to indicate a correspondence between a beam indication codeword in downlink control information (DCI) and the activated beam indication information, where m is a positive integer; and send downlink control information (DCI) to the terminal, in which the DCI includes a first beam indication codeword, and the first beam indication codeword is configured to indicate target beam indication information corresponding to a target antenna panel in the m antenna panels.

The solution according to the embodiment of the present disclosure is described from the perspective of interaction between the base station and the terminal. It should be understood that the terminal and the base station include respective hardware structures and/or software modules for performing the above functions. In combination with the units and algorithm steps of the examples described in the embodiments disclosed in this specification, the embodiments of the present disclosure may be implemented by hardware, or a combination of hardware and computer software. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Figure 7:
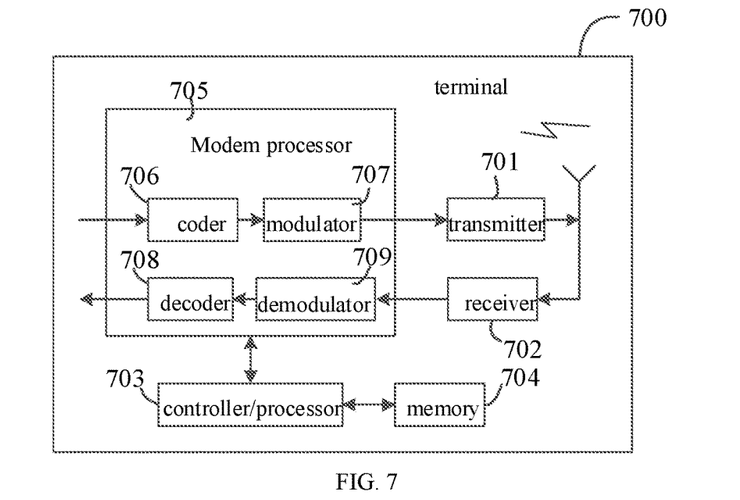
FIG. 7 is a block diagram illustrating a terminal according to an embodiment.

FIG. 7 is a block diagram of a terminal according to an embodiment.

The terminal 700 includes a transmitter 701, a receiver 702 and a processor 703. The processor 703 may be a controller, and is denoted as "controller/processor 703" in FIG. 7. Alternatively, the terminal 700 may further include a Modem processor 705 which may include a coder 706, a modulator 707, a decoder 708 and a demodulator 709.

In an example, the transmitter 701 performs adjustment (for example, analog conversion, filtering, amplification, up-conversion and so on) on an output sample and generates an uplink signal. The uplink signal is transmitted to the base station described above via the antenna. On the uplink, the antenna receives a downlink signal transmitted by the base station described above. The receiver 702 performs adjustment (for example, filtering, amplification, down-conversion, digitalization and so on) on the signal received from the antenna and provides an input sample. In the Modem processor 705, the coder 706 receives business data and signaling messages to be sent on the uplink and processes the business data and signaling messages (for example, by normalizing, encoding and interweaving). The modulator 707 further processes the encoded business data and signaling messages (for example by signal mapping and modulating) and provides an output sample. The demodulator 709 processes the input sample (for example by demodulating) and provides a symbol estimation. The decoder 708 processes the symbol estimation (for example, by de-interweaving and decoding) and provides decoded data and signaling messages to be sent to the terminal 700. The coder 706, the modulator 707, the demodulator 709 and the decoder 708 may be implemented by the integrated Modem processor 705. Those units perform operations based on the wireless access technology (for example, the access technology of LTE and other evolution systems) adopted by the wireless access network. It should be noted that, when the terminal 700 does not include the Modem processor 705, the above functions of the Modem processor 705 may be also implemented by the processor 703.

The processor 703 is configured to control and manage actions of the terminal 700, to perform processing procedures conducted by the terminal 700 described in the foregoing embodiments. For example, the processor 703 is further configured to perform respective steps at the terminal side described in the foregoing embodiments, and/or other steps of the technical solutions described in the embodiments of the present disclosure.

Further, the terminal 700 may further include a memory 704 configured to store program codes and data of the terminal 700.

It should be understood that FIG. 7 merely shows a simplified design of the terminal 700. In actual applications, the terminal 700 may include any number of transmitters, receivers, processors, Modem processors, memories and so on, and any terminal which may implement the embodiment of the present disclosure falls into the scope of the embodiment of the present disclosure.

Figure 8:
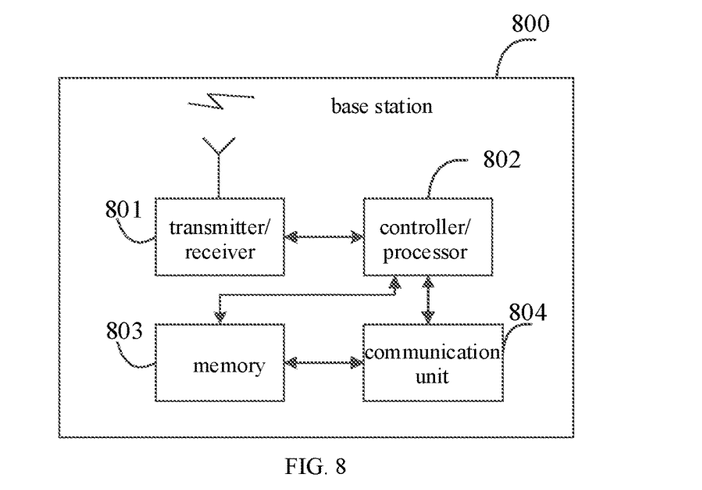
FIG. 8 is a block diagram illustrating a base station according to an embodiment.

FIG. 8 is a block diagram of a base station according to an example embodiment.

The base station 800 includes a transmitter/receiver 801 and a processor 802. The processor 802 may be a controller, and is denoted as "controller/processor 802" in FIG. 8. The transmitter/receiver 801 is configured to support data transmission between the base station and the terminal described in the foregoing embodiments, and support communication between the base station and other network entities. The processor 802 performs various functions to communicate with the terminal. On the uplink, an uplink single from the terminal may be received via the antenna, demodulated by the receiver 801 (for example, demodulating a high-frequency signal to a baseband signal), and further processed by the processor 802 to restore the business data and signaling messages sent by the terminal. On the downlink, the business data and signaling messages are processed by the processor 802, modulated by the transmitter 801 (for example, modulating a baseband signal to a high-frequency signal) to generate a downlink signal, which is transmitted to the terminal via the antenna. It should be noted that the above modulation and demodulation functions may also be implemented by the processor 802. For example, the processor 802 is further configured to perform respective steps at the base station side described in the foregoing embodiments, and/or other steps of the technical solutions described in the embodiments of the present disclosure.

Further, the base station 800 may further include a memory 803 configured to store program codes and data of the base station 800. The base station 800 may further include a communication unit 804. The communication unit 804 is configured to support the communication between the base station and other network entities (such as network devices in the core network). For example in the 5G NR system, the communication unit 804 may be an NG-U interface, configured to support the communication between the base station 800 and a UPF (User Plane Function) entity. Or, the communication unit 804 may be an NG-C interface, configured to support the communication between the base station 800 and an AMF (Access and Mobility Management Function) entity.

It should be understood that FIG. 8 merely shows a simplified design of the base station 800. In actual applications, the base station 800 may include any number of transmitters, receivers, processors, controllers, memories, communication units and so on, and any base station which may implement the embodiment of the present disclosure falls into the scope of the embodiment of the present disclosure.

Embodiments of the present disclosure further provide a non-transitory computer storage medium. The non-transitory computer-readable storage medium has computer programs stored thereon. When the computer programs are executed by a processor of a terminal, the data transmission method at the terminal side described above may be implemented.

Embodiments of the present disclosure further provide a non-transitory computer storage medium. The non-transitory computer-readable storage medium has computer programs stored thereon. When the computer programs are executed by a processor of a base station, the data transmission method at the base station side described above may be implemented.

It should be understood that, as used herein, "a plurality of" means two or more than two, unless specified otherwise. The term "and/or" represents an association relation between associated listed items, containing three association relations. For example, A and/or B is satisfied by any one of the following: A exists separately, B exists separately, and both A and B exist. The symbol "/" generally represents a relation of "or" between the associated listed items.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings and that various modifications and changes can be made without departing from the scope thereof. It is intended that the scope of the invention only be limited by the appended claims.

What is claimed is:

1. A data transmission method, performed by a terminal, comprising:
receiving a media access control (MAC) signaling sent by a base station, wherein the MAC signaling is configured to activate beam indication information respectively corresponding to m antenna panels, the beam indication information corresponding to an antenna panel is configured to indicate a beam used when the antenna panel is adopted to transmit data, the MAC signaling comprises mapping information configured to indicate a correspondence between a beam indication codeword in downlink control information (DCI) and the activated beam indication information, where m is a positive integer;

receiving the DCI sent by the base station, wherein the DCI comprises a first beam indication codeword;

determining target beam indication information corresponding to a target antenna panel in the m antenna panels based on the first beam indication codeword and the mapping information;

determining a target beam used when the target antenna panel is adopted to transmit data based on the target beam indication information; and using the target beam corresponding to the target antenna panel to transmit data with the base station;

wherein a number of pieces of the beam indication information activated by the MAC signaling is k, where k is a positive integer;

wherein the mapping information comprises k redefining numbers from 0 to k−1, and the k redefining numbers have a one-to-one correspondence with k pieces of beam indication information activated by the MAC signaling;

wherein, in the mapping information, a number indication codeword corresponding to a beam indication codeword has r bits, and each number indication codeword indicates one or more of the activated k pieces of beam indication information;

wherein the number indication codeword is a codeword configured to indicate the redefining number, where r is a positive integer;

wherein, initial numbers of the beam indication information of the m antenna panels are numbered jointly;

after the k pieces of beam indication information activated by the MAC signaling are ordered based on a first rule, the k pieces of beam indication information have the one-to-one correspondence with the k redefining numbers;

wherein the first rule indicates ordering based on the initial numbers from small to big or from big to small.

2. The method of claim 1, wherein,
for an ith beam indication codeword in the mapping information, when a number of pieces of beam indication information corresponding to the ith beam indication codeword is a and a is greater than 1, the a pieces of beam indication information correspond to a different antenna panels, where i is a positive integer.

3. The method of claim 1, said determining target beam indication information corresponding to a target antenna panel in the m antenna panels based on the first beam indication codeword and the mapping information comprising:

obtaining a first number indication codeword from the mapping information, wherein the first number indication codeword is a number indication codeword corresponding to the first beam indication codeword, and the mapping information comprises a correspondence between beam indication codewords and number indication codewords, the number indication codeword is a codeword configured to indicate the redefining number;

determining a first redefining number indicated by the first number indication codeword; and determining beam indication information corresponding to the first redefining number to obtain the target antenna panel and the target beam indication information.

4. The method of claim 1, wherein,
initial numbers of the beam indication information of the m antenna panels are numbered independently;

after the k pieces of beam indication information activated by the MAC signaling are ordered based on a second rule, the k pieces of beam indication information have the one-to-one correspondence with the k redefining numbers;

wherein the second rule indicates ordering the beam indication information of the m antenna panels based on identification information of the m antenna panels, wherein the identification information of the m antenna panels are ordered from big to small or from small to big and the beam indication information of a same antenna panel is ordered based on the initial numbers from small to big or from big to small.

5. The method of claim 1, wherein,
the MAC signaling activates the same number of pieces of beam indication information for each antenna panel.

6. The method of claim 1, wherein, the MAC signaling is further configured to update one or both of the activated beam indication information and the mapping information.

7. The method of claim 1, wherein,
the MAC signaling activates different numbers of pieces of beam indication information for at least two antenna panels.

8. A data transmission method, performed by a base station, comprising:

sending a media access control (MAC) signaling to a terminal, wherein the MAC signaling is configured to activate beam indication information respectively corresponding to m antenna panels, the beam indication information corresponding to an antenna panel is configured to indicate a beam used when the antenna panel is adopted to transmit data, the MAC signaling comprises mapping information configured to indicate a correspondence between a beam indication codeword in downlink control information (DCI) and the activated beam indication information, where m is a positive integer; and sending downlink control information (DCI) to the terminal, wherein the DCI comprises a first beam indication codeword, and the first beam indication codeword is configured to indicate target beam indication information corresponding to a target antenna panel in the m antenna panels;

wherein a number of pieces of the beam indication information activated by the MAC signaling is k, where k is a positive integer;

wherein the mapping information comprises k redefining numbers from 0 to k−1, and the k redefining numbers have a one-to-one correspondence with k pieces of beam indication information activated by the MAC signaling;

wherein, in the mapping information, a number indication codeword corresponding to a beam indication codeword has r bits, and each number indication codeword indicates one or more of the activated k pieces of beam indication information;

wherein the number indication codeword is a codeword configured to indicate the redefining number, where r is a positive integer;

wherein, initial numbers of the beam indication information of the m antenna panels are numbered jointly;

after the k pieces of beam indication information activated by the MAC signaling are ordered based on a first rule, the k pieces of beam indication information have the one-to-one correspondence with the k redefining numbers;

wherein the first rule indicates ordering based on the initial numbers from small to big or from big to small.

9. A data transmission apparatus, applied in a base station, comprising:

a processor;

a memory storing instructions executable by the processor;

wherein, the processor is configured to perform the data transmission method according to claim 8.

10. A data transmission apparatus, applied in a terminal, comprising:

a processor;

a memory storing instructions executable by the processor;

wherein, the processor is configured to:

receive a media access control (MAC) signaling sent by a base station, wherein the MAC signaling is configured to activate beam indication information respectively corresponding to m antenna panels, the beam indication information corresponding to an antenna panel is configured to indicate a beam used when the antenna panel is adopted to transmit data, the MAC signaling comprises mapping information configured to indicate a correspondence between a beam indication codeword in downlink control information (DCI) and the activated beam indication information, where m is a positive integer;

receive the DCI sent by the base station, wherein the DCI comprises a first beam indication codeword;

determine target beam indication information corresponding to a target antenna panel in the m antenna panels based on the first beam indication codeword and the mapping information;

determine a target beam used when the target antenna panel is adopted to transmit data based on the target beam indication information; and use the target beam corresponding to the target antenna panel to transmit data with the base station;

wherein a number of pieces of the beam indication information activated by the MAC signaling is k, where k is a positive integer;

wherein the mapping information comprises k redefining numbers from 0 to k−1, and the k redefining numbers have a one-to-one correspondence with k pieces of beam indication information activated by the MAC signaling;

wherein, in the mapping information, a number indication codeword corresponding to a beam indication codeword has r bits, and each number indication codeword indicates one or more of the activated k pieces of beam indication information;

wherein the number indication codeword is a codeword configured to indicate the redefining number, where r is a positive integer;

wherein, initial numbers of the beam indication information of the m antenna panels are numbered jointly;

after the k pieces of beam indication information activated by the MAC signaling are ordered based on a first rule, the k pieces of beam indication information have the one-to-one correspondence with the k redefining numbers;

wherein the first rule indicates ordering based on the initial numbers from small to big or from big to small.

11. The apparatus of claim 10, wherein, for an ith beam indication codeword in the mapping information, when a number of pieces of beam indication information corresponding to the ith beam indication codeword is a and a is greater than 1, the a pieces of beam indication information correspond to a different antenna panels, where i is a positive integer.

12. The apparatus of claim 10, wherein, initial numbers of the beam indication information of the m antenna panels are numbered independently;

after the k pieces of beam indication information activated by the MAC signaling are ordered based on a second rule, the k pieces of beam indication information have the one-to-one correspondence with the k redefining numbers;

wherein the second rule indicates ordering the beam indication information of the m antenna panels based on identification information of the m antenna panels, wherein the identification information of the m antenna panels are ordered from big to small or from small to big and the beam indication information of a same antenna panel is ordered based on the initial numbers from small to big or from big to small.

* * * * *